(12) United States Patent
Nara

(10) Patent No.: US 7,925,804 B2
(45) Date of Patent: Apr. 12, 2011

(54) FIFO DEVICE AND METHOD OF STORING DATA IN FIFO BUFFER

(75) Inventor: Masatoshi Nara, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 126 days.

(21) Appl. No.: 12/457,282

(22) Filed: Jun. 5, 2009

(65) Prior Publication Data

US 2009/0313402 A1 Dec. 17, 2009

(30) Foreign Application Priority Data

Jun. 17, 2008 (JP) ................................ 2008-157402
Mar. 24, 2009 (JP) ................................ 2009-072033

(51) Int. Cl.
*G06F 3/00* (2006.01)
*G06F 5/00* (2006.01)

(52) U.S. Cl. ......................................... 710/52; 712/226

(58) Field of Classification Search .................... 710/24, 710/52

See application file for complete search history.

(56) References Cited

U.S. PATENT DOCUMENTS

| 6,018,779 | A | * | 1/2000 | Blumenau ........................ 710/68 |
| 6,571,319 | B2 | * | 5/2003 | Tremblay et al. ............. 711/140 |
| 6,671,752 | B1 | | 12/2003 | Rao |
| 7,017,020 | B2 | * | 3/2006 | Herbst et al. .................. 711/167 |
| 7,587,521 | B2 | * | 9/2009 | Akiyama et al. .................. 710/5 |
| 2003/0217223 | A1 | * | 11/2003 | Nino et al. ..................... 711/105 |

FOREIGN PATENT DOCUMENTS

| EP | 0 997 822 A2 | 5/2000 |
| JP | 63-292356 | 11/1988 |
| JP | 2000-132497 A | 5/2000 |
| JP | 2002-149591 A | 5/2002 |
| JP | 2006-004340 A | 1/2006 |

* cited by examiner

*Primary Examiner* — Henry W Tsai
*Assistant Examiner* — Elias Mamo
(74) *Attorney, Agent, or Firm* — Foley & Lardner LLP

(57) ABSTRACT

A FIFO device includes: a FIFO buffer that holds a transfer request transferred from a bus and including a write address, a data size, and write data, and outputs the transfer request to a bus; and a transfer request generation unit that receives, from the bus, a first transfer request and a second transfer request subsequent to the first transfer request, to determine whether the second transfer request can be combined with the first transfer request based on a write address and a data size of the first transfer request and a write address and a data size of the second transfer request, and when determining that the transfer requests can be combined together, holds a combined transfer request obtained by combining the first transfer request and the second transfer request together, to store the combined transfer request in the FIFO buffer.

20 Claims, 11 Drawing Sheets

FIFO DEVICE AND METHOD OF STORING DATA IN FIFO BUFFER

BACKGROUND

1. Field of the Invention

The present invention relates to a FIFO (First-In First-Out) buffer that transfers data between buses.

2. Description of Related Art

FIFO buffers are employed when data is transferred between buses. The FIFO buffers each store data transfer requests in order of receipt of the requests. The data transfer requests are executed by processing units. Accordingly, the data size of a single transfer request does not necessarily match the bus width. Additionally, in each FIFO buffer, the transfer requests that can be combined together have not been combined together. As a result, as the number of transfer requests increases, the number of access to buses increases. This hampers the improvement of the transfer efficiency.

FIG. 11 shows a configuration example of a FIFO device. A FIFO device 90 shown in FIG. 11 includes a FIFO buffer 91 that stores a write address, a FIFO buffer 92 that stores a write data strobe, and a FIFO buffer 93 that stores write data. The FIFO device 90 receives a write address, a write data strobe, and write data as transfer requests from a bus 14, and stores them respectively in the FIFO buffers 91 to 93. The FIFO device 90 outputs the stored transfer requests to a bus 15 in order of receipt of the transfer requests.

The FIFO device 90 shown in FIG. 11 sequentially transfers the transfer requests from the bus 14 to the bus 15. As a result, when the transfer requests are sequentially transferred to the bus 15, a load is likely to be imposed on the bus.

Japanese Unexamined Patent Application Publication No. 2002-149591 discloses a technology for optimizing the bus utilization for data read transfer and data write transfer. In the technology disclosed in Japanese Unexamined Patent Application Publication No. 2002-149591, the type of data transfer is determined, and data is asynchronously transferred between buses in a device using a FIFO according to the determined transfer type. According to the technology, however, data items to be stored in the FIFO are not combined together.

Further, Japanese Unexamined Patent Application Publication Nos. 2006-4340, 2000-132497, and 63-292356 each disclose a technology for reducing the number of data transfer operations to reduce a transfer time in direct memory access (DMA) data transfer. The DMA technology is premised on the use of consecutive data, and thus is hardly applied to a plurality of transfer requests received by a FIFO device.

SUMMARY

As described above, the present inventor has found a problem that, when transfer requests received from a single bus are sequentially transferred to another bus in a FIFO device, the transfer efficiency deteriorates.

In order to solve the above-mentioned problem, a first exemplary aspect of an embodiment of the present invention is a FIFO (First-In First-Out) device that holds a transfer request transferred from a first bus and including a write address, a data size, and write data, and outputs the transfer request to a second bus, the FIFO device including: a transfer request generation unit that receives, from the first bus, a first transfer request and a second transfer request subsequent to the first transfer request, to make a determination whether the first transfer request and the second transfer request can be combined together, based on a write address and a data size of the first transfer request and a write address and a data size of the second transfer request, and when determining that the first transfer address and the second transfer address can be combined together, replaces a combined transfer request obtained by combining the first transfer request and the second transfer request together, with the first transfer request to be held and output; and a FIFO buffer that holds the transfer request output from the transfer request generation unit, and transfers the transfer request to the second bus. A plurality of transfer requests are combined together to be transferred, thereby enabling a reduction in the number of transfer requests to be stored in the FIFO buffer.

A second exemplary aspect of an embodiment of the present invention is a method of storing data in a FIFO buffer, including: receiving and holding a first transfer request transferred from a first bus to a second bus, the first transfer request including a write address, a data size, and write data; further receiving a second transfer request from the first bus; determining whether the first transfer request and the second transfer request can be combined together, based on the write address and the data size of the first transfer request and a write address and a data size of the second transfer request; replacing a combined transfer request obtained by combining the first transfer request and the second transfer request together, with the first transfer request, when a result of the determination indicates that the first transfer request and the second transfer request can be combined together, and holding the first transfer request; and storing the first transfer request in the FIFO buffer when the determination result indicates that the first transfer request and the second transfer request cannot be combined together.

According to an exemplary embodiment of the present invention, it is possible to provide a FIFO device that holds a transfer request obtained by combining a plurality of transfer requests together, when the transfer requests received by the FIFO device can be combined together.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Exemplary embodiments of the present invention will be described below with reference to the drawings. To clarify the explanation, omissions and simplifications are made as necessary in the following description and the drawings. Components having the same structure or function and the corresponding components are denoted by the same reference symbols, and an explanation thereof is omitted.

In addition, the present invention is premised on that each transfer request for requesting data write contains at least information indicating a write address, a data size, and write data. The data size may be information indicating the size of write data. Alternatively, the data size may correspond to a write data strobe (also referred to as "write strobe" hereinafter) which indicates a position of a buffer at which the write data is stored.

First Exemplary Embodiment

Figure 1:
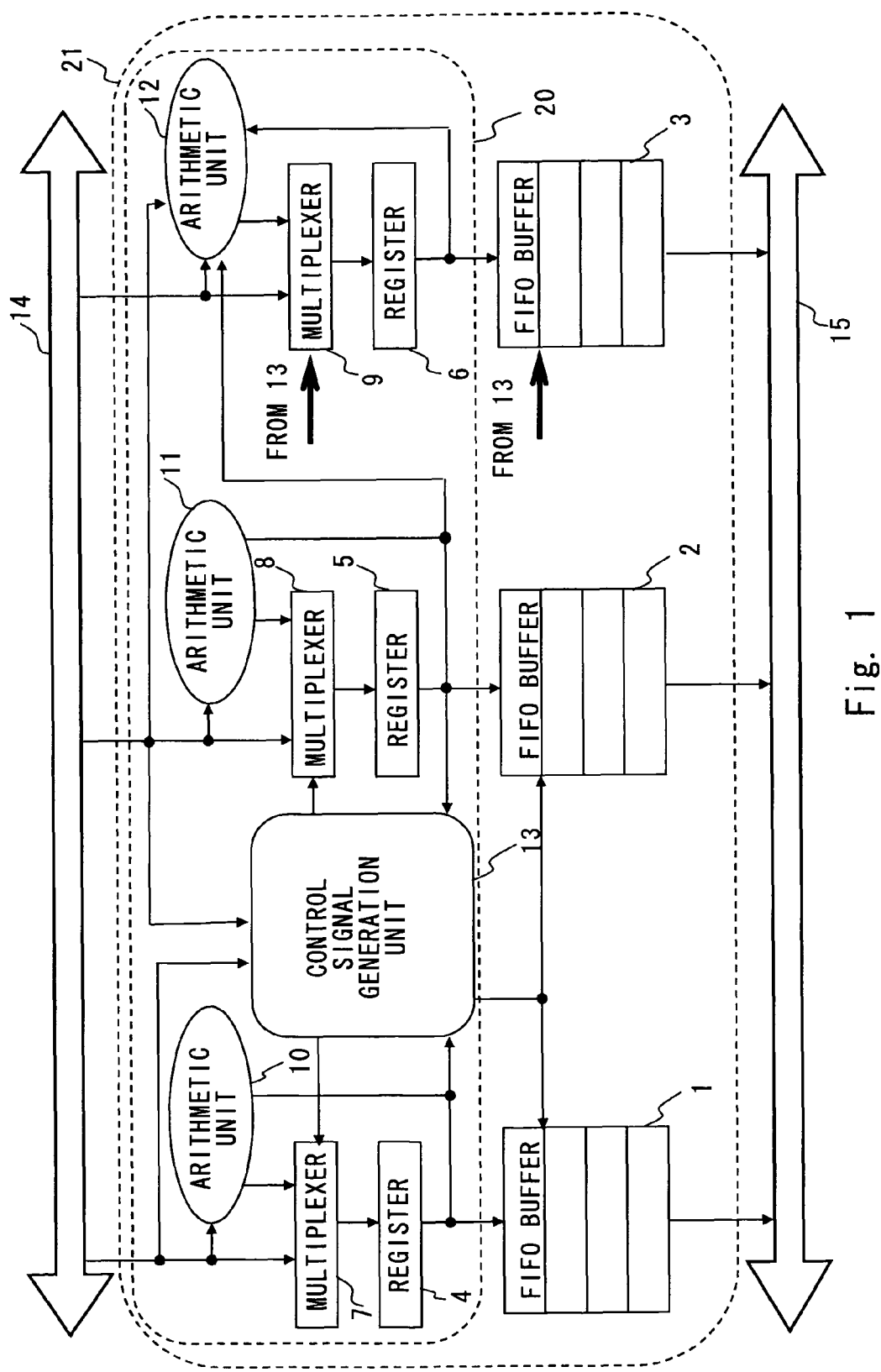
FIG. 1 is a diagram showing a configuration example of a FIFO device according to a first exemplary embodiment of the present invention.

In a first exemplary embodiment of the present invention, a case where a transfer request including a write address, a write data strobe, and write data, is received as a transfer request will be described by way of example. FIG. 1 is a diagram showing a configuration example of a FIFO device according to the first exemplary embodiment of the present invention. A FIFO device 21 includes FIFO buffers 1 to 3 and a transfer request generation unit 20. The FIFO device 21 receives transfer requests from a bus 14 (first bus) to cause the transfer request generation unit 20 to store the transfer requests in the FIFO buffers 1 to 3, and outputs the transfer requests to a bus 15 (second bus).

The FIFO buffer 1 stores a write address. The FIFO buffer 2 stores a data size (which corresponds to a write strobe in this exemplary embodiment). The FIFO buffer 3 stores write data.

An outline of functions of the transfer request generation unit 20 is described below. First, consideration is given to a case where the transfer request generation unit 20 receives, from the bus 14, a transfer request (hereinafter, referred to as "first transfer request") to hold the transfer request, and then receives, from the bus 14, another transfer request (hereinafter, referred to as "second transfer request") subsequent to the first transfer request. The transfer request generation unit 20 determines whether the second transfer request can be combined with the first transfer request with the use of the write address and write strobe of the first transfer request and the write address and write data strobe of the second transfer request. A method for the determination is described later with reference to FIG. 2.

The transfer request generation unit 20 holds a combined transfer request obtained by combining the first transfer request and the second transfer request together, based on the determination result. The transfer request generation unit 20 repeatedly makes a determination of a newly received transfer request (hereinafter, referred to as "third transfer request"). When the third transfer request can be combined with the combined transfer request, the two transfer requests are combined together. When the newly received transfer request cannot be combined with the transfer request that is already held, the transfer request generation unit 20 stores the held transfer request in the FIFO buffers. The case where the transfer request generation unit 20 first holds the first transfer request has been described above by way of example, but it is determined whether a newly received transfer request can be combined with the held transfer request every time a new transfer request is received. The transfer request generation unit 20 holds the combined transfer request when the transfer requests can be combined together according to the determination result, and holds the newly received transfer request (e.g., second transfer request or third transfer request) when the transfer requests cannot be combined together, without combining the newly received transfer request with the held transfer request.

Hereinafter, a description is given of an example in which the transfer request generation unit 20 is implemented using the components shown in FIG. 1. The transfer request generation unit 20 includes registers 4 to 6, multiplexers 7 to 9, arithmetic units 10 to 12, and a control signal generation unit 13. The number of each of the registers, multiplexers, and arithmetic units corresponds to the number of types of information included in a transfer request. In this exemplary embodiment, for example, a transfer request includes three types of information, i.e., a write address, a data size, and write data, and therefore, the number of each of the registers, multiplexers, and arithmetic units to be provided is three.

The register 4, the multiplexer 7, and the arithmetic unit 10 are circuits related to the write address. A value held in the register 4 is stored as the write address in the FIFO buffer 1. Likewise, the register 5, the multiplexer 8, and the arithmetic unit 11 are circuits related to the write strobe. A value held in the register 5 is stored as the write strobe in the FIFO buffer 2. The register 6, the multiplexer 9, and the arithmetic unit 12 are circuits related to the write data. A value held in the register 6 is stored as the write data in the FIFO buffer 3.

The registers 4 to 6 are connected to the FIFO buffers 1 to 3, respectively. The registers 4 to 6 hold the values output from the multiplexers 7 to 9, respectively. Specifically, the registers 4 to 6 each hold a value included in the previous transfer request, or a value calculated by the corresponding arithmetic units 10 to 12. Further, the registers 4 to 6 each have a size equal to the size of a single storage area (a single record) of each of the FIFO buffers 1 to 3.

The multiplexers 7 to 9 are connected to their registers 4 to 6, respectively. The multiplexers 7 to 9 each receive a value of a transfer request received from the bus 14 and a value calculated by the corresponding arithmetic units 10 to 12, and output one of the values to the corresponding registers 4 to 6 based on a control signal output from the control signal generation unit 13.

The arithmetic unit 10 calculates the output of the register 4 and the write address received from the bus 14, and outputs them to the multiplexer 7. The arithmetic unit 11 calculates the output of the register 5 and the write strobe received from the bus 14, and outputs them to the multiplexer 8. The arithmetic unit 12 combines the output of the register 6 with the write data received from the bus 14. Upon combining the write data, the arithmetic unit 12 specifies a position at which the write data is to be combined, based on the write strobe of the register 5, and then combines the write data. When determining that the transfer requests cannot be combined together, the arithmetic units 10 to 12 may input a value indicating that the register is not used, as a result of calculation, or may output calculation results.

The control signal generation unit 13 generates two kinds of control signals with the use of the write address and the write strobe, which are output from the bus 14, the write address as the output of the register 4, and the write strobe as the output of the register 5. Specifically, the control signal generation unit 13 generates a selection signal and a write signal. The selection signal is a signal for selecting a value from among the values output from the multiplexers 7 to 9, and is output to each of the multiplexers 7 to 9. The write signal is a signal for instructing to write the outputs of the registers 4 to 6 into the FIFO buffers 1 to 3, respectively, and is output to each of the FIFO buffers 1 to 3.

Referring to FIG. 1, when the write address and write strobe included in the first transfer request are stored in the registers 4 and 5, and when the write address and write strobe included in the second transfer request subsequent to the first transfer request are output from the bus 14, the control signal generation unit 13 carries out the following operations.

The control signal generation unit 13 determines whether the transfer requests can be combined together, based on the write address and write strobe described above. More specifically, the control signal generation unit 13 determines whether the transfer requests can be combined together, based on whether the outputs of the registers 4 to 6 (i.e., transfer requests previously received and already held in the registers) and the current transfer request (i.e., transfer request transferred from the bus 14) can be accommodated in an unused area of the register 6. When determining that the transfer requests can be combined together, the control signal generation unit 13 generates a selection signal for causing the multiplexers to select the signal received from the arithmetic units 10 to 12. Meanwhile, when determining that the transfer requests cannot be combined together, the control signal generation unit 13 generates a selection signal for causing the multiplexers to select a signal received from the bus 14.

Figure 2:
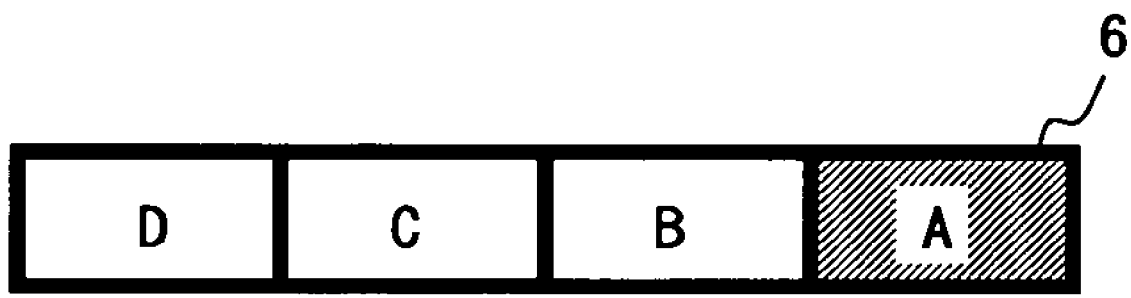
FIG. 2 is a diagram showing a configuration example of a register that stores write data.

A description is given using an area of the register 6 shown in FIG. 2. It is assumed that the register 6 has a capacity of four bytes including one byte areas "A" to "D", and that the write data is already held at an address 100 in the area "A" that is provided at the right end. Specifically, a case is assumed in which the address 100 is held as the write address in the register 4, and the write data is held in the area "A" of the register 6. In this case, when a transfer request as described below is newly received, two transfer requests can be combined together. The write data to be written at the address 100 is held in the area "A" of the register 6, and thus, write addresses 102 to 106 can be accommodated in the unused area of the register 6. Further, any of the following data sizes can be used. That is, a data size of three bytes, two bytes, or one byte for the write address 102, a data size of two bytes or one byte for the write address 104, and a data size of one byte for the write address 106.

Further, when the transfer requests are not combined together, the control signal generation unit 13 generates a write signal and outputs the write signal to each of the FIFO buffers 1 to 3. The FIFO buffers 1 to 3 store the values held in the registers 4 to 6, in response to the write signal. Note that when the values held in the registers 4 to 6 are values each indicating that the register is not used (hereinafter, referred to as "initial value" for ease of explanation), the control signal generation unit 13 generates no write signal even when it is determined that the transfer requests are not combined together.

Figure 3:
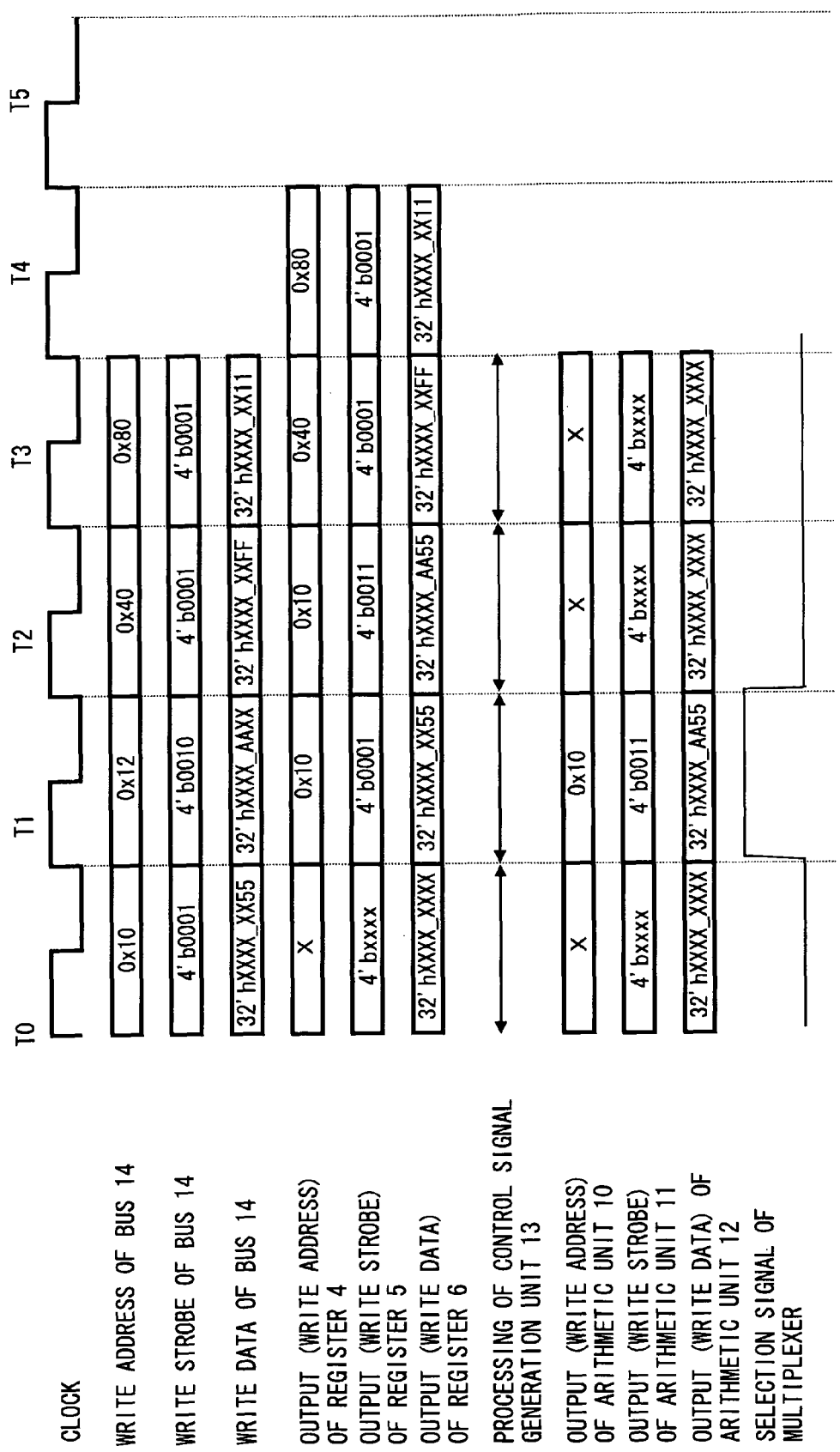
FIG. 3 is a timing diagram showing an example in which transfer requests are combined together when write addresses are consecutive.
Figure 4:
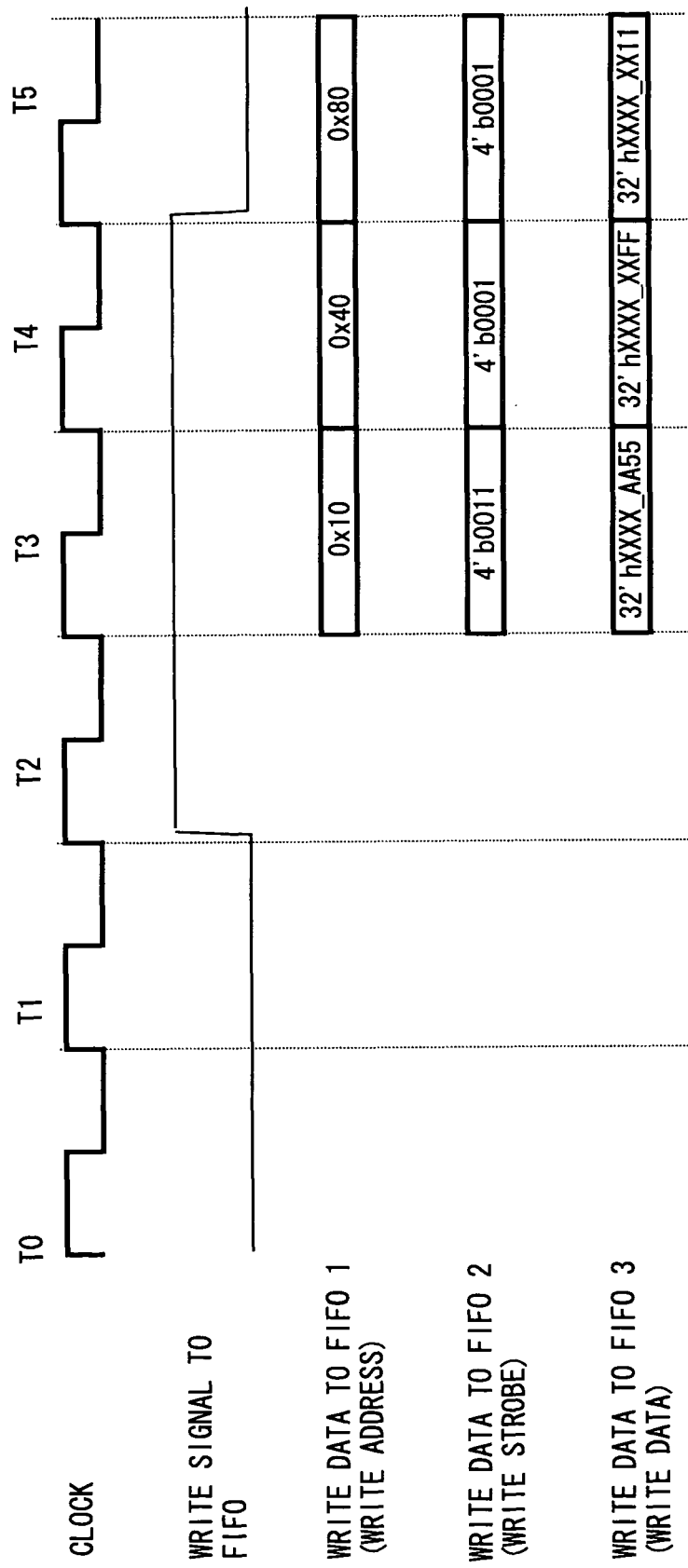
FIG. 4 is a timing diagram showing an example in which transfer requests are combined together when write addresses are consecutive.
Figure 5:
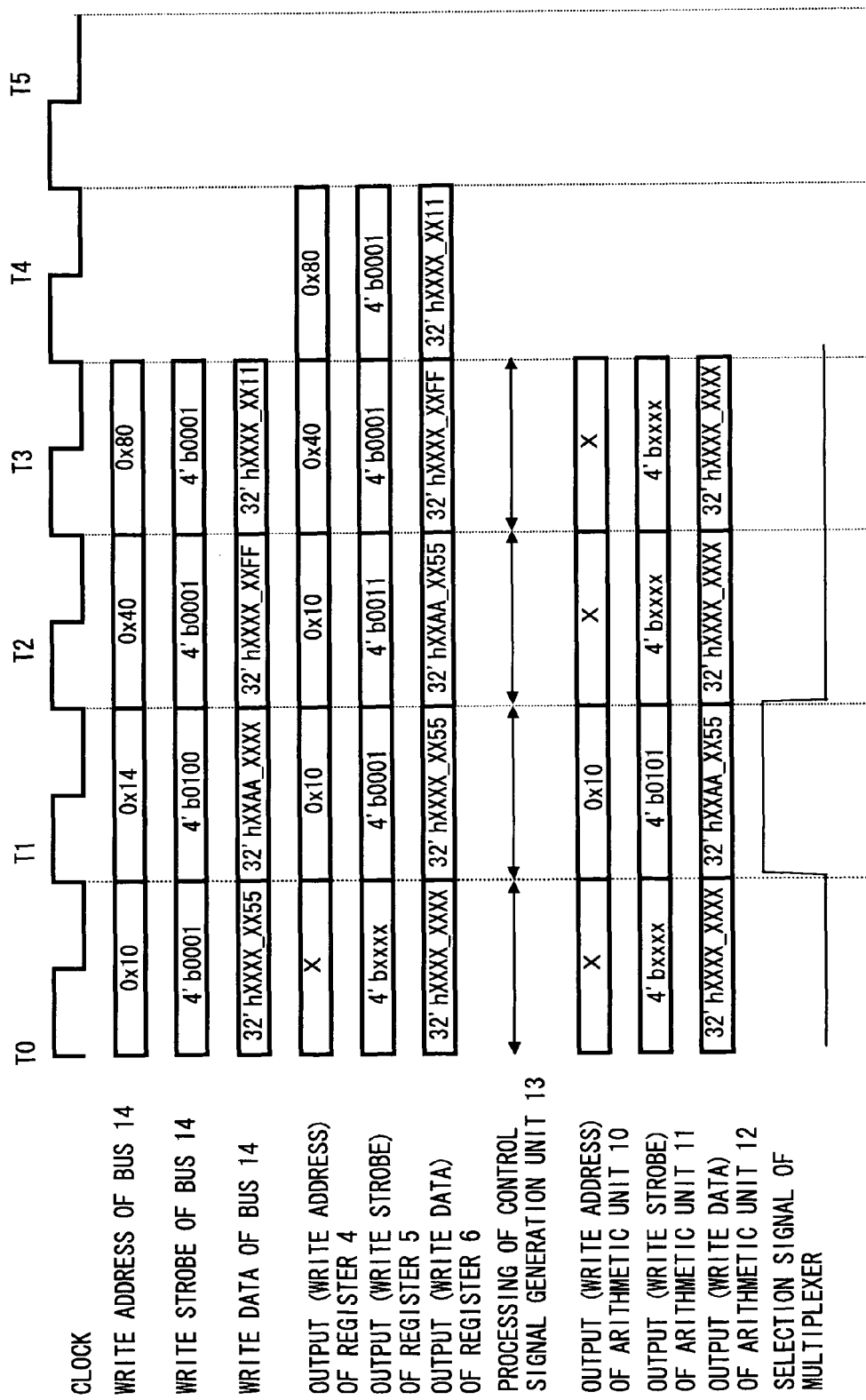
FIG. 5 is a timing diagram showing an example in which transfer requests are combined together when the transfer requests can be accommodated in an unused area of a register.
Figure 6:
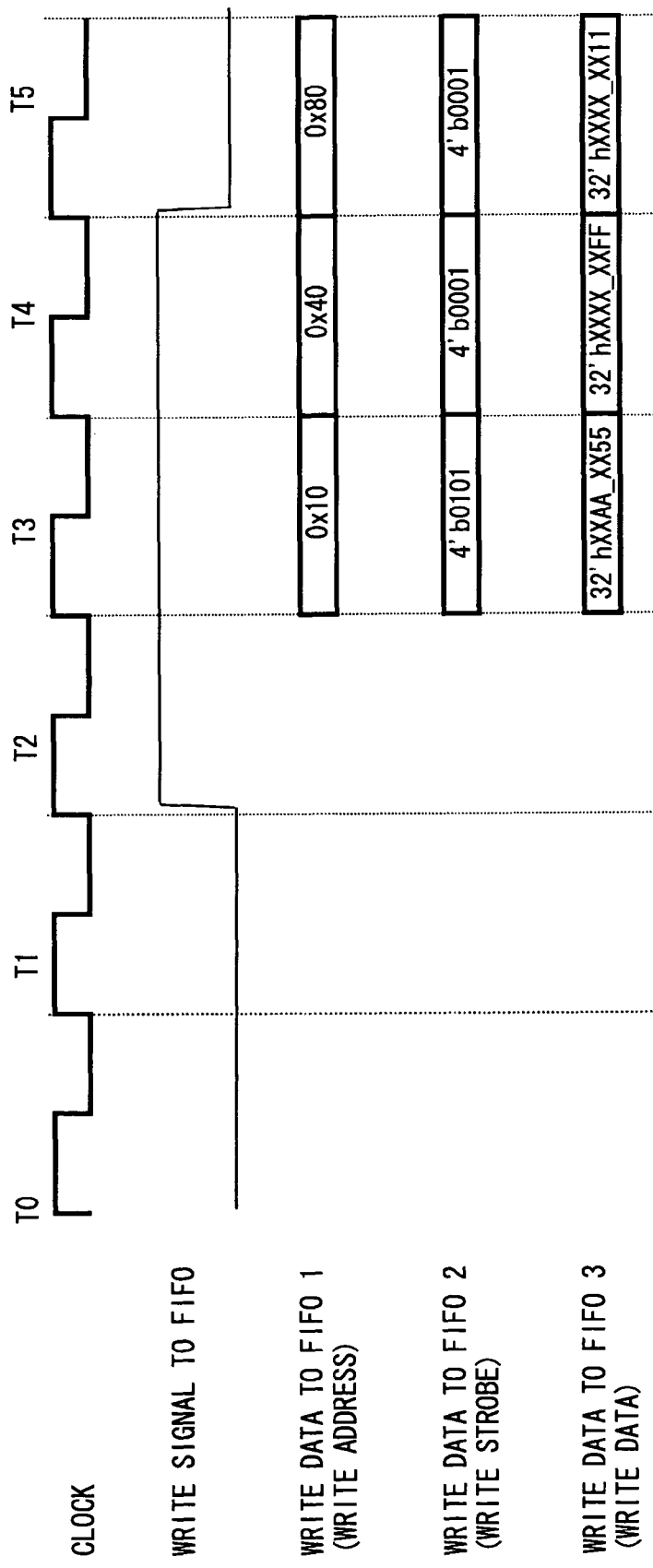
FIG. 6 is a timing diagram showing an example in which transfer requests can be combined together when the transfer requests can be accommodated in an unused area of a register.

Next, operations of the FIFO device 21 according to this exemplary embodiment will be described with reference to timing diagrams. FIGS. 3 and 4 are timing diagrams each showing an example in which the transfer requests are combined together when the write addresses are consecutive. FIGS. 5 and 6 are timing diagrams each showing an example in which the transfer requests are combined together when a newly received transfer request can be accommodated in the unused area of the register 6. FIGS. 3 to 6 each show clock times T0 to T5. In each register, it is assumed that a value X of an address, a value 4'bxxxx of a write strobe, and a value 32'hXXXX_XXXX of data are initial values.

First, a description is given of an example in which the transfer requests are combined together when the write addresses are consecutive. Referring to FIG. 3, a write address 0x10, a write strobe 4'b0001, and data 32'hXXXX_XX55, which are transferred to the bath 14 at the time of the clock T0, are input to the multiplexers 7 to 9 as well as to the arithmetic units 10 to 12, respectively. Further, the write address 0x10 is input to the control signal generation unit 13, and the write strobe 4'b0001 is input to each of the arithmetic unit 12 and the control signal generation unit 13.

The arithmetic unit 10 calculates a write address used at the time of combining the transfer requests together, with the use of the write address of the register 4 and the write address of the bus 14. In this case, the arithmetic unit 10 may determine whether the transfer requests can be combined together, and may set the initial values when the transfer requests are not combined together. Alternatively, the arithmetic unit 10 may set calculation results without determining whether the transfer requests can be combined together. Even when the write address output from the arithmetic unit 10 is an unusable value (invalid value), the write address of the bus 14 is selected by the selection signal output from the control signal generation unit 13. The arithmetic units 11 and 12 also output the calculation results in a similar manner. This exemplary embodiment shows, by way of example, the case where the arithmetic units 10, 11, and 12 set the initial values.

The control signal generation unit 13 compares the write address and the write strobe, which are received from the bus 14, with the write address and the write strobe, which are held in the registers 4 and 5, respectively, thereby determining whether the transfer requests can be combined together. Each of the arrows shown in the item of the control signal generation unit 13 of FIG. 3 indicates a period of time for determining whether the transfer requests can be combined together, based on the write address and the write strobe. Specifically, the control signal generation unit 13 compares the address X of the register 4 with the address 0x10 received from the bus 14. In this case, the address is not within a range that can be accommodated in the unused area of the register 6, and therefore, the transfer request newly received from the bus 14 cannot be accommodated in the unused area of the register 6. The control signal generation unit 13 determines that the transfer requests cannot be combined together, and generates a selection signal for outputting the output from the bus 14 to each of the registers 4 to 6, that is, a signal of L (zero) level in FIG. 3. Then, the control signal generation unit 13 outputs the generated selection signal to each of the multiplexers 7 to 9. During a time period from T0 to T1, the multiplexers 7 to 9 each select the data output from the bus 14, and on the rising edge of the clock T1, the registers 4 to 6 hold the data output from the bus 14.

Since the values held in the registers 4 to 6 are the initial values, the control signal generation unit 13 maintains the write signal at the L (zero) level. It is assumed herein that, when the signal is at an H (1) level, the values of the registers 4 to 6 are written into the FIFO buffers 1 to 3, respectively, in response to the write signal.

A write address 0x12, a write strobe 4'b0010, and data 32'hXXXX_AAXX, which are transferred to the bus 14 at the time of the clock T1, are input to the multiplexers 7 to 9 as well as to the arithmetic units 10 to 12, respectively. Further, the write address 0x12 is input to the control signal generation unit 13, and the write strobe 4'b0010 is input to the arithmetic unit 12 and the control signal generation unit 13.

The control signal generation unit 13 compares the write address 0x10 of the register 4 with the write address 0x12 received from the bus 14, and also compares the write strobe 4'b0010 received from the bus 14 with the write strobe 4'b0001 of the register 5. In this case, the write address is a value within the range that can be accommodated in the unused area of the register 6. Additionally, an area for storing the write strobe 4'b0010, which is received from the bus, does not overlap an area for storing the write strobe 4'b0001 of the register 5. Accordingly, the transfer request newly received from the bus 14 can be accommodated in the unused area of the register 6. In the example shown in FIG. 3, the data size is determined by the write strobe. The control signal generation unit 13 determines that the transfer requests can be combined together, and generates a selection signal for outputting the outputs from the arithmetic units 10 to 12 to the registers 4 to 6, respectively, that is, a signal of H (1) level in FIG. 3. Then, the control signal generation unit 13 outputs the generated selection signal to each of the multiplexers 7 to 9. During a time period from T1 to T2, the multiplexers 7 to 9 each select the data output from the arithmetic units 10 to 12, and on the rising edge of the clock T2, the registers 4 to 6 hold the data output from the arithmetic units 10 to 12.

Further, since the transfer requests are to be combined together, the control signal generation unit 13 maintains the write signal at the L (zero) level.

A write address 0x40, the write strobe 4'b0001, and data 32'hXXXX_XXFF, which are transferred to the bus 14 at the time of the clock T2, are input to the multiplexers 7 to 9 as well as to the arithmetic units 10 to 12, respectively. Further, the write address 0x40 is input to the control signal generation unit 13, and the write strobe 4'b0001 is input to each of the arithmetic unit 12 and the control signal generation unit 13.

The control signal generation unit 13 compares the write address 0x10 of the register 4 with the write address 0x40 received from the bus 14. In this case, the write address is not within the range that can be accommodated in the unused area of the register 6, and therefore, the transfer request newly received from the bus 14 cannot be accommodated in the unused area of the register 6. The control signal generation unit 13 determines that the transfer requests cannot be combined together, and generates a selection signal for outputting the output from the bus 14 to each of the registers 4 to 6. Then, the control signal generation unit 13 outputs the generated selection signal to each of the multiplexers 7 to 9. During a time period from T2 to T3, the multiplexers 7 to 9 each select the data output from the bus 14, and on the rising edge of the clock T3, the registers 4 to 6 hold the data output from the bus 14.

Further, since the transfer requests are not to be combined together, the control signal generation unit 13 changes the write signal to the H (1) level. On the rising edge of the clock T3, the FIFO buffers 1 to 3 store the data held in the registers 4 to 6, respectively.

A write address 0x80, the write strobe 4'b0001, and data 32'hXXXX_XX11, which are transferred to the bus 14 at the time of the clock T3, are input to the multiplexers 7 to 9 as well as to the arithmetic units 10 to 12, respectively. Further, the write address 0x80 is input to the control signal generation unit 13, and the write strobe 4'b0001 is input to each of the arithmetic unit 12 and the control signal generation unit 13.

The control signal generation unit 13 compares the write address 0x40 of the register 4 with the write address 0x80 received from the bus 14. In this case, the write address is not within the range that can be accommodated in the unused area of the register 6, and therefore, the transfer request newly received from the bus 14 cannot be accommodated in the unused area of the register 6. The control signal generation unit 13 determines that the transfer requests cannot be combined together, and generates a selection signal for outputting the output from the bus 14 to each of the registers 4 to 6. Then, the control signal generation unit 13 outputs the generated selection signal to each of the multiplexers 7 to 9. During a time period from T3 to T4, the multiplexers 7 to 9 each select the data output from the bus 14, and on the rising edge of the clock T4, the registers 4 to 6 hold the data output from the bus 14.

Further, since the transfer requests are not to be combined together, the control signal generation unit 13 maintains the write signal at the H (1) level. On the rising edge of the clock T4, the FIFO buffers 1 to 3 store the data held in the registers 4 to 6, respectively.

Next, a description is given of an example in which the transfer requests are combined together when the newly received transfer request can be accommodated in the unused area of the register 6. Referring to FIG. 5, the write address 0x10, the write strobe 4'b0001, and the data 32'hXXXX_XX55, which are transferred to the bus 14 at the time of the clock T0, are input to the multiplexers 7 to 9 as well as to the arithmetic units 10 to 12, respectively. Further, the write address 0x10 is input to the control signal generation unit 13, and the write strobe 4'b0001 is input to each of the arithmetic unit 12 and the control signal generation unit 13. The control signal generation unit 13 compares the write address and write strobe, which are received from the bus 14, with the write address and write strobe, which are held in the registers 4 and 5, respectively, thereby determining whether the transfer requests can be combined together. The arrows shown in the item of the control signal generation unit 13 of FIG. 5 are similar to those of FIG. 3.

The control signal generation unit 13 compares the write address X of the register 4 with the write address 0x10 received from the bus 14. In this case, the write address is not within the range that can be accommodated in the unused area of the register 6, and therefore, the transfer request newly received from the bus 14 cannot be accommodated in the unused area of the register 6. The control signal generation unit 13 determines that the transfer requests cannot be combined together, and generates a selection signal for outputting the output from the bus 14 to each of the registers 4 to 6, that is, a signal of L (zero) level in FIG. 5. Then, the control signal generation unit 13 outputs the generated selection signal to each of the multiplexers 7 to 9. During a time period from T0 to T1, the multiplexers 7 to 9 each select the data output from the bus 14, and on the rising edge of the clock T1, the registers 4 to 6 hold the data output from the bus 14.

Further, since the values held in the registers 4 to 6 are the initial values, the control signal generation unit 13 maintains the write signal at the L (zero) level.

A write address 0x14, a write strobe 4'b0100, and data 32'hXXAA_XXXX, which are transferred to the bus 14 at the time of the clock T1, are input to the multiplexers 7 to 9 as well as to the arithmetic units 10 to 12, respectively. Further, the write address 0x14 is input to the control signal generation unit 13, and the write strobe 4'b0100 is input to each of the arithmetic unit 12 and the control signal generation unit 13.

The control signal generation unit 13 compares the write address 0x10 of the register 4 with the write address 0x14 received from the bus 14. In this case, the write address falls within the range that can be accommodated in the unused area of the register 6. Additionally, an area for storing the write strobe 4'b0100, which is received from the bus, does not overlap an area for storing the write strobe 4'b0001 of the register 5. Accordingly, the transfer request newly received from the bus 14 can be accommodated in the unused area of the register 6. The control signal generation unit 13 determines that the transfer requests can be combined together, and generates a selection signal for outputting the output from the bus 14 to each of the registers 4 to 6, that is, a signal of H (1) level in FIG. 5. Then, the control signal generation unit 13 outputs the generated selection signal to each of the multiplexers 7 to 9. During the time period from T1 to T2, the multiplexers 7 to 9 each select the data output from the arithmetic units 10 to 12, and on the rising edge of the clock T2, the registers 4 to 6 hold the data output from the arithmetic units 10 to 12, respectively.

Further, since the transfer requests are to be combined together, the control signal generation unit 13 maintains the write signal at the L (zero) level.

The write address 0x40, the write strobe 4'b0001, and the data 32'hXXXX_XXFF, which are transferred to the bus 14 at the time of the clock T2, are input to the multiplexers 7 to 9 as well as to the arithmetic units 10 to 12, respectively. Further, the write address 0x40 is input to the control signal generation unit 13, and the write strobe 4'b0001 is input to each of the arithmetic unit 12 and the control signal generation unit 13.

The control signal generation unit 13 compares the write address 0x10 of the register 4 with the write address 0x40 received from the bus 14. In this case, the write address is not within the range that can be accommodated in the unused area of the register 6, and therefore, the transfer request newly received from the bus 14 cannot be accommodated in the unused area of the register 6. The control signal generation unit 13 determines that the transfer requests cannot be combined together, and generates a selection signal for outputting the output from the bus 14 to each of the registers 4 to 6. Then, the control signal generation unit 13 outputs the generated selection signal to each of the multiplexers 7 to 9. During the time period from T2 to T3, the multiplexers 7 to 9 each select the data output from the bus 14, and on the rising edge of the clock T3, the registers 4 to 6 hold the data output from the bus 14.

Further, since the transfer requests are not to be combined together, the control signal generation unit 13 changes the write signal to the H (1) level. On the rising edge of the clock T3, the FIFO buffers 1 to 3 hold the data held in the registers 4 to 6.

The write address 0x80, the write strobe 4'b0001, and the data 32'hXXXX_XX11, which are transferred to the bus 14 at the time of the clock T3, are input to the multiplexers 7 to 9 as well as to the arithmetic units 10 to 12, respectively. Further, the write address 0x80 is input to the control signal generation unit 13, and the write strobe 4'b0001 is input to each of the arithmetic unit 12 and the control signal generation unit 13.

The control signal generation unit 13 compares the write address 0x40 of the register 4 with the write address 0x80 received from the bus 14. In this case, the write data is not within the range that can be accommodated in the unused area of the register 6, the transfer request newly received from the bus 14 cannot be accommodated in the unused area of the register 6. The control signal generation unit 13 determines that the transfer requests cannot be combined together, and generates a selection signal for outputting the output from the bus 14 to each of the registers 4 to 6. Then, the control signal generation unit 13 outputs the generated selection signal to each of the multiplexers 7 to 9. During the time period from T3 to T4, the multiplexers 7 to 9 each select the data output from the bus 14, and on the rising edge of the clock T4, the registers 4 to 6 hold the data output from the bus 14.

Further, since the transfer requests are not to be combined together, the control signal generation unit 13 maintains the write signal at the H (1) level. On the rising edge of the clock T4, the FIFO buffers 1 to 3 store the data held in the registers 4 to 6, respectively.

The case where two transfer requests are combined together has been described above with reference to FIGS. 3 to 6. When write data can be accommodated in the unused area of the register 6, however, three or more transfer requests can be combined together. For example, at the time T3 of FIG. 4, the register 6 stores write data in the areas "A" and "B" shown in FIG. 2. If the transfer request transfers, at the time T2, write data that can be stored in the areas "C" and "D" shown in FIG. 2, the transfer requests can be combined together. Likewise, at the time T3 of FIG. 6, the register 6 stores write data in the areas "A" and "C" shown in FIG. 2. If the transfer request transfers, at the time T2, write data that can be stored in the areas "B" and "D" shown in FIG. 2 at the time of T2, the transfer requests can be combined together. Note that, in this exemplary embodiment, the data size and data storage position are specified using the write strobe, which makes it possible to combine the write data that can be accommodated in the areas "B" and "D" shown in FIG. 2.

As described above, in this exemplary embodiment of the present invention, a combined transfer request is generated by combining a plurality of transfer requests that can be combined together, before access is made to the bus 15, thereby achieving a reduction in the number of access to the bus. This leads to a reduction in the load on the bus.

Second Exemplary Embodiment

Figure 7:
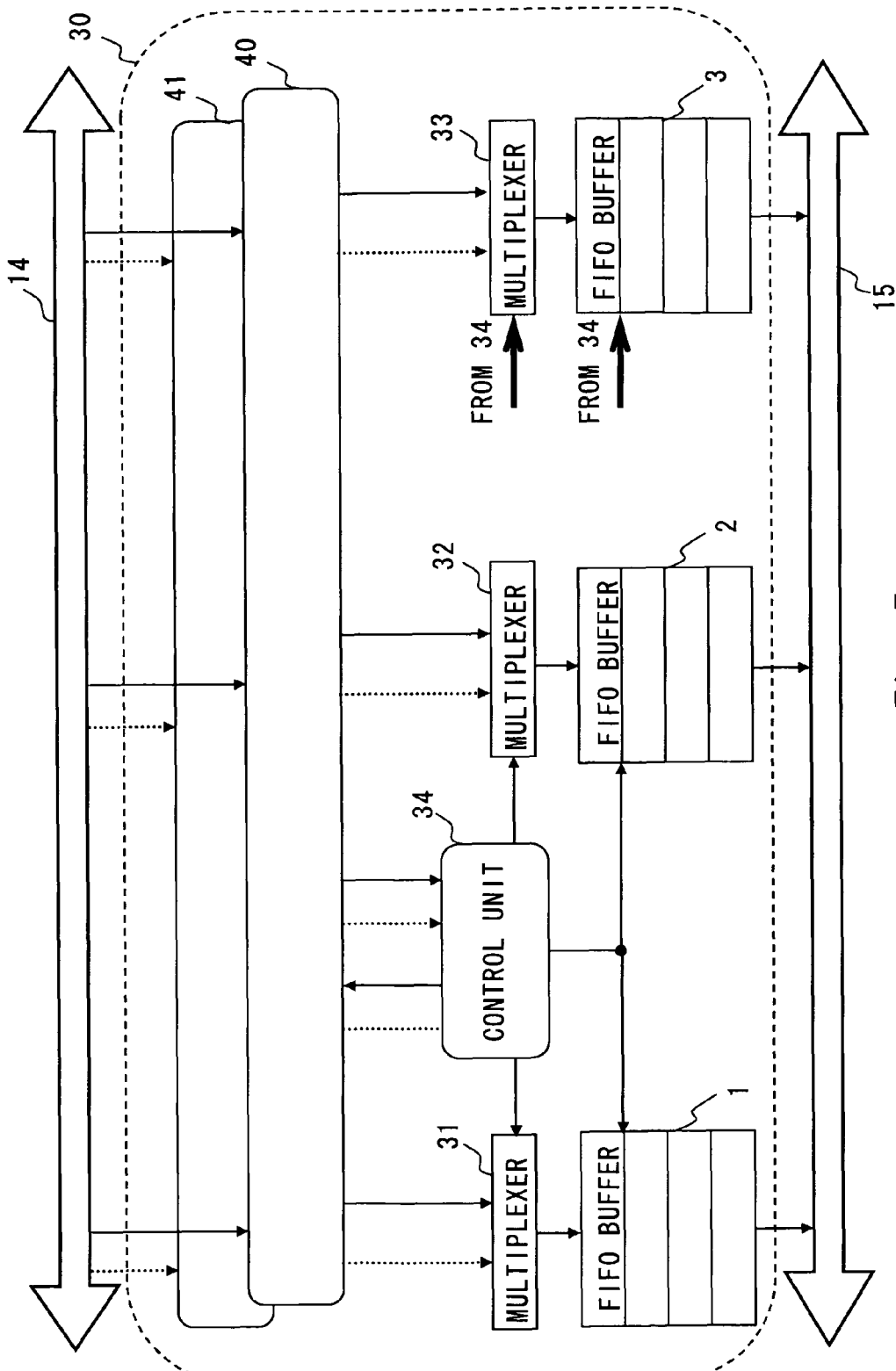
FIG. 7 is a diagram showing a configuration example of a FIFO device according to a second exemplary embodiment of the present invention.
Figure 8:
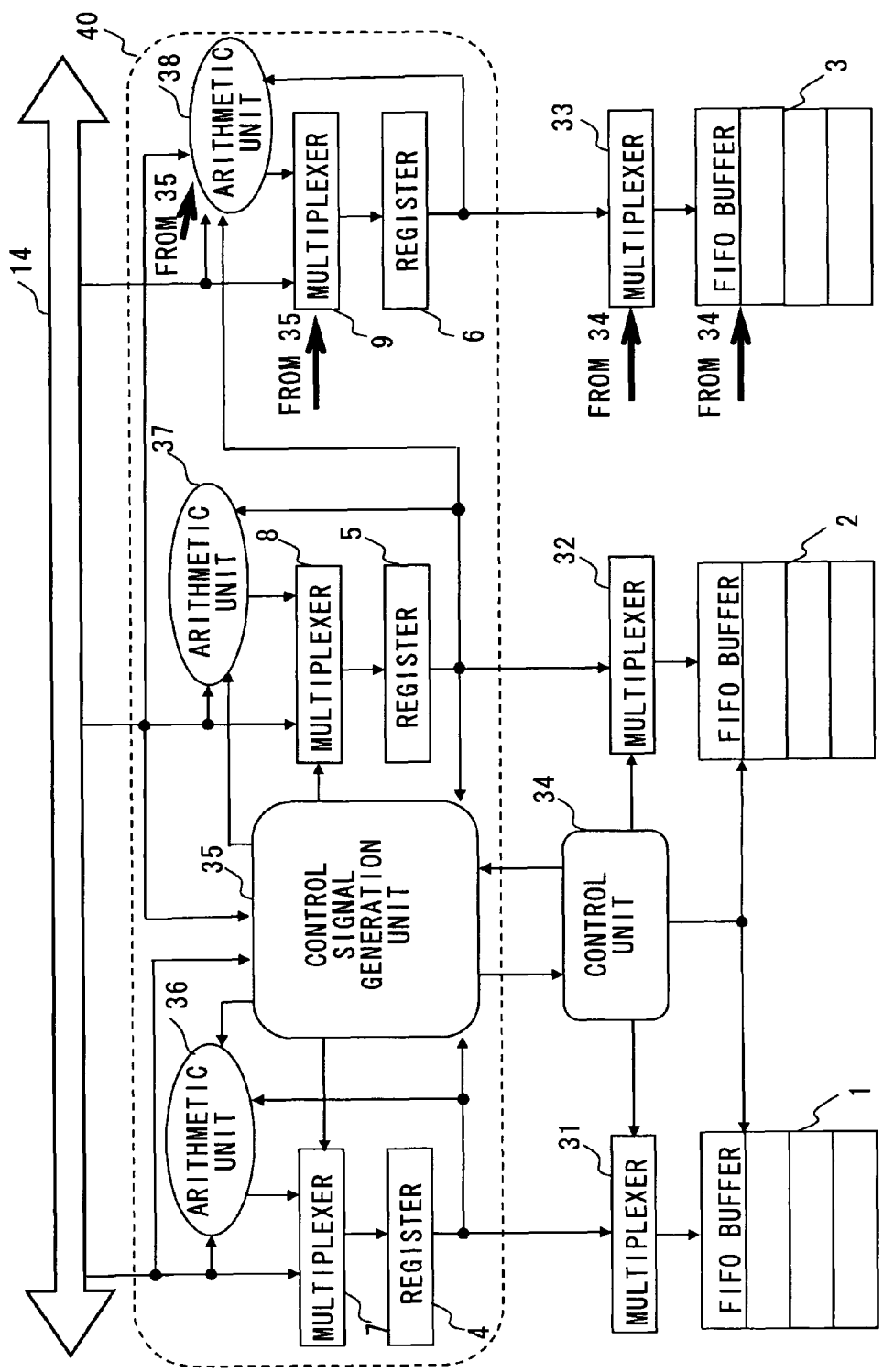
FIG. 8 is a diagram showing a relationship between transfer request generation units and a control unit of the FIFO device according to the second exemplary embodiment.

In a second exemplary embodiment of the present invention, a description is given of a case where a plurality of transfer request generation units 20 shown in FIG. 1 are provided, and a plurality of transfer requests that are combined together (combined transfer requests) are held. FIG. 7 is a diagram showing a configuration example of a FIFO device according to the second exemplary embodiment of the present invention. FIG. 8 is a diagram showing a relationship between transfer request generation units and a control unit of the FIFO device according to the second exemplary embodiment. Configurations and operations which are different from those of the first exemplary embodiment are mainly described below.

A FIFO device 30 shown in FIG. 7 includes FIFO buffers 1 to 3, a plurality of multiplexers (selection units) 31 to 33, a control unit 34, and a plurality of transfer request generation units 40 and 41. In FIG. 7, the input and output of the transfer request generation unit 40 are indicated by the solid lines, and the input and output of the transfer request generation unit 41 are indicated by the dotted lines. Note that an arrow indicating an input from each of the multiplexers 31 to 33 to the transfer request generation unit 41 is omitted, since the arrow overlaps the transfer request generation unit 40.

The multiplexers 31 to 33 each select any of the transfer requests output from the transfer request generation units 40 and 41 in response to a control signal (selection signal) output from the control unit 34.

The control unit 34 realizes a function of instructing the plurality of transfer request generation units 40 and 41 to accept a transfer request, and a function of writing the transfer request held by the transfer request generation unit 40 and 41, into the FIFO buffers 1 to 3.

First, a description is given of the function of instructing the plurality of transfer request generation units 40 and 41 to accept a transfer request. The control unit 34 selects at least one of the plurality of transfer request generation units 40 and 41, and instructs the selected transfer request generation unit to start accepting the transfer request transferred from the bus 14. Further, the control unit 34 receives a determination result indicating whether the transfer request newly transferred from the bus 14 can be combined with the transfer request that is already held, from the transfer request generation unit. When the new transfer request is not accepted, the control unit 34 selects the transfer request generation unit that accepts the new transfer request, and instructs the selected transfer request generation unit to accept the new transfer request.

Specifically, in the case where another transfer request generation unit has not started accepting the transfer request, the control unit 34 instructs the another transfer request generation unit to start accepting the transfer request.

Further, when the transfer request generation unit capable of combining the new transfer request is not present, that is, when none of the plurality of transfer request generation units is capable of combining the new transfer request, the control unit 34 selects any one of the plurality of transfer request generation units.

Upon notification of the determination result indicating that the selected transfer request generation unit is not capable of combining the new transfer request, the control unit 34 implements the function of writing the transfer request held by the selected transfer request generation unit, into the FIFO buffers 1 to 3. Specifically, the control unit 34 causes the multiplexers 31 to 33 to select the transfer request held by the selected transfer request generation unit, and writes the selected transfer request into the FIFO buffers 1 to 3 with the use of the write signal. At the same time, the control unit 34 instructs the selected transfer request generation unit to accept the new transfer request.

The transfer request generation units 40 and 41 each determine whether the transfer request that is already held can be combined with the new transfer request. The transfer request that is already held refers to a transfer request that is previously held, to be specific, a transfer request that is accepted first (hereinafter, referred to as "first transfer request") or a combined transfer request replaced by the first transfer request. The combined transfer request is similar to that of the first exemplary embodiment, so a description thereof is omitted.

Each of the transfer request generation units 40 and 41 notifies the control unit 34 of the determination result. Then, when determining that the transfer requests can be combined together, the transfer request generation units 40 and 41 hold the combined transfer request that is newly generated. Further, when determining that the transfer requests cannot be combined together, the transfer request generation units 40 and 41 continuously hold the transfer request that is already held. After that, when the control unit 34 requests to accept the transfer request newly transferred from the bus 14, the transfer request generation units 40 and 41 hold the new transfer request as a subsequent transfer request.

A configuration example of the transfer request generation unit 40 will be described in detail with reference to FIG. 8. The transfer request generation units 40 and 41 have the same configuration and operate in the same manner, so the transfer request generation unit 40 is herein described. In addition, components denoted by the same reference numerals as those of FIG. 1 have the same functions, so a description thereof is omitted.

During a time period in which the control unit 34 instructs to start acceptance of the transfer request, for example, during a time period in which a signal indicating the status of the transfer request generation unit 40 is active (e.g., H), a control signal generation unit 35 controls the acceptance of the transfer request. The control signal generation unit 35 determines whether the transfer request newly transferred from the bus 14 can be combined with the transfer request that is already held, and notifies the control unit 34 of the determination result.

When determining that the transfer requests can be combined together, the control signal generation unit 35 causes arithmetic units 36 to 38 to output the combined transfer request. Meanwhile, when determining that the transfer requests cannot be combined together, the control signal generation unit 35 causes the arithmetic units 36 to 38 to output the combined transfer request which is previously calculated and held in the registers 4 to 6. For example, when the control signal output from the control signal generation unit 35 to the arithmetic unit 36 is at the H (1) level, the arithmetic unit 36 calculates the value of the register 4 and the address received from the bus 14 and outputs the calculation results. When the control signal is at the L (zero) level, the arithmetic unit 36 outputs the value of the register 4. Simultaneously, the control signal generation unit 35 outputs a selection signal for causing the multiplexers 7 to 9 to select the combined transfer requests (i.e., outputs of the arithmetic units 36 to 38).

Further, upon reception of an instruction from the control unit 34 to accept the new transfer request, the control signal generation unit 35 outputs a selection signal for causing the multiplexers 7 to 9 to select the new transfer request (i.e., an output from the bus 14). The case of receiving the instruction to accept the new transfer request includes the following cases. That is, a case of receiving an instruction to start acceptance of the transfer request, and a case of receiving an instruction to accept the new transfer request after notifying the determination result indicating whether the transfer requests can be combined or not. Unlike in the first exemplary embodiment, the control signal generation unit 35 outputs no write signal to the FIFO buffers 1 to 3.

Figure 9:
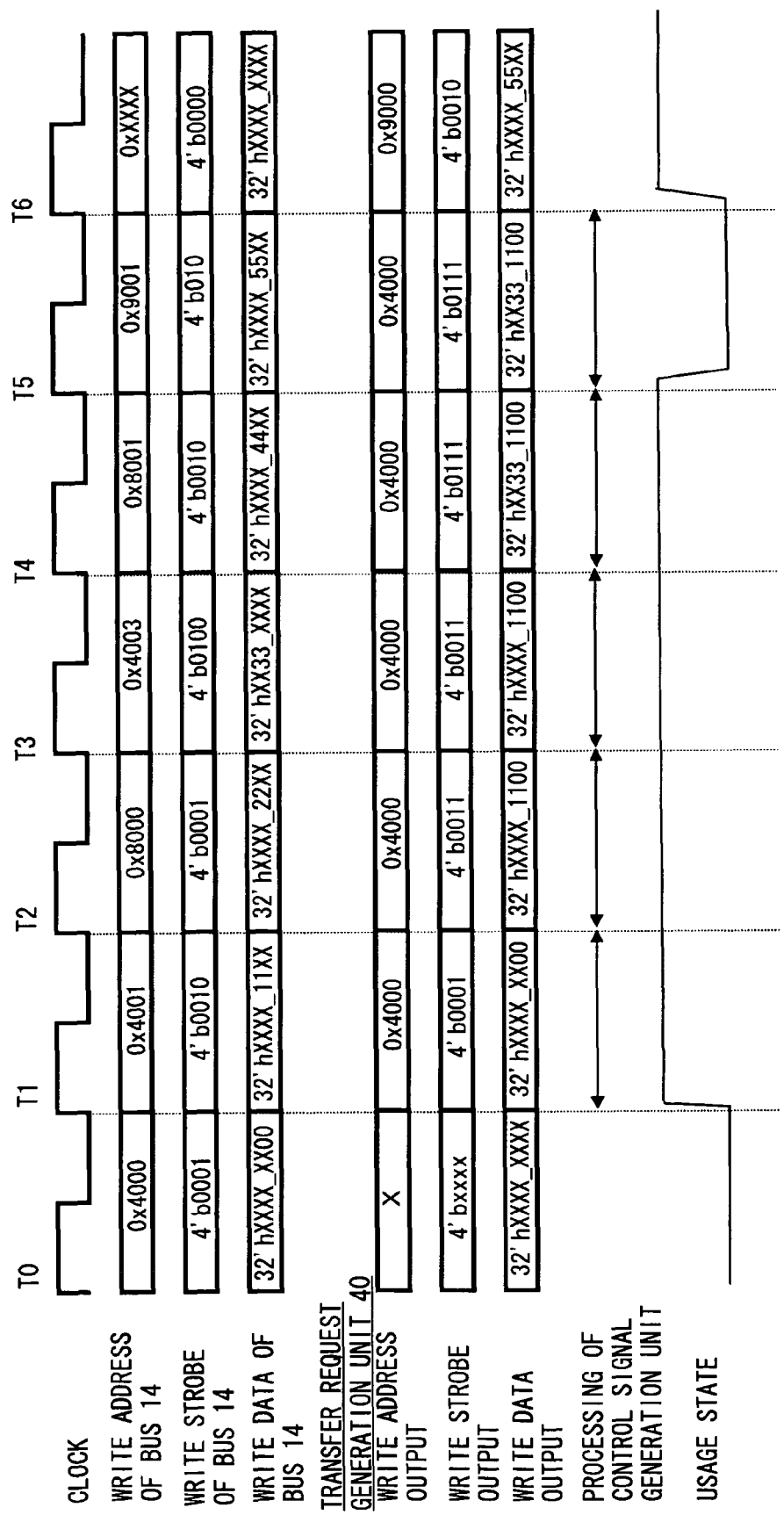
FIG. 9 is a timing diagram showing an example in which transfer requests are combined together in the FIFO device according to the second exemplary embodiment.
Figure 10:
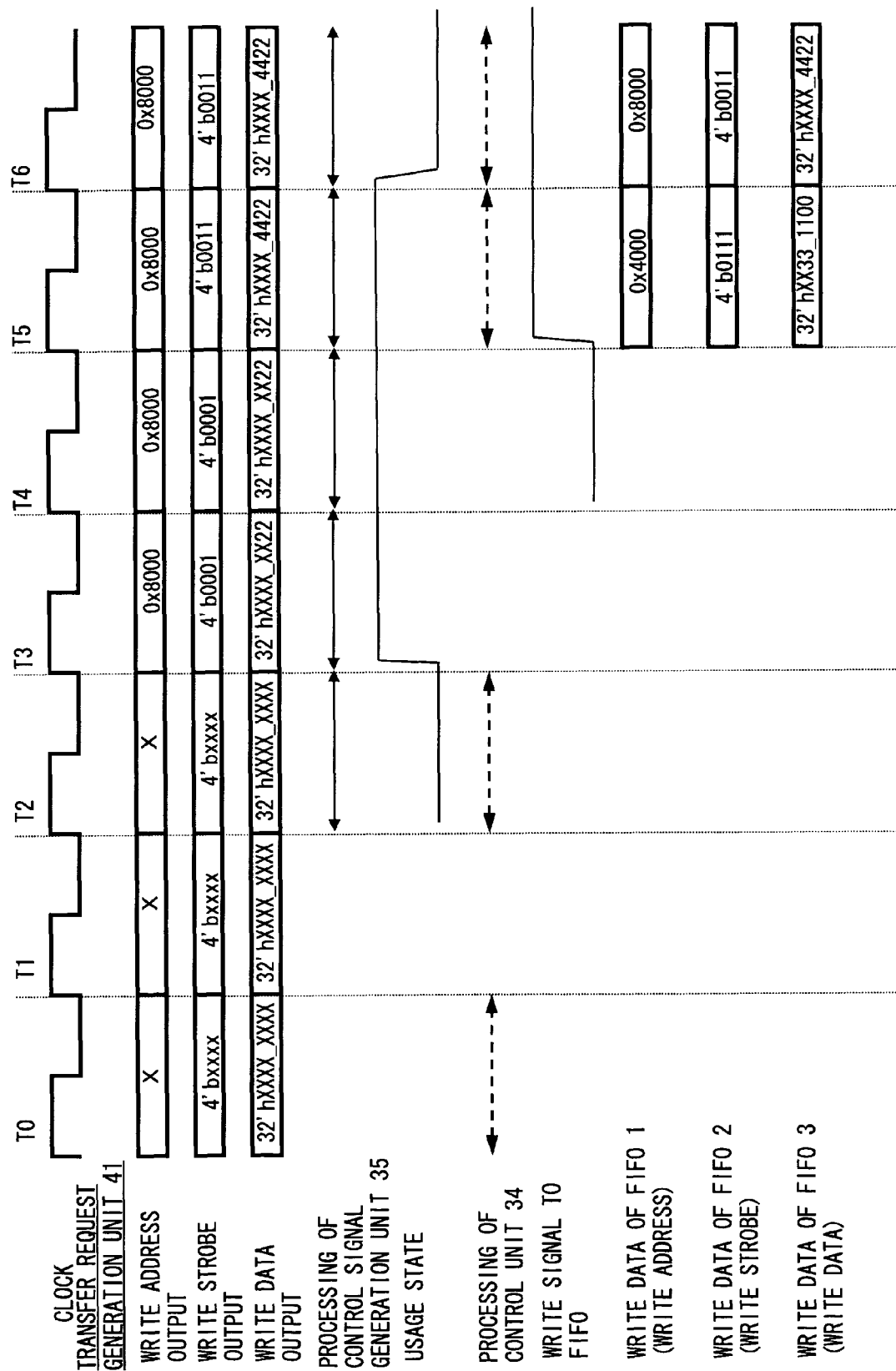
FIG. 10 is a timing diagram showing an example in which transfer requests are combined together in the FIFO device according to the second exemplary embodiment.
Figure 11:
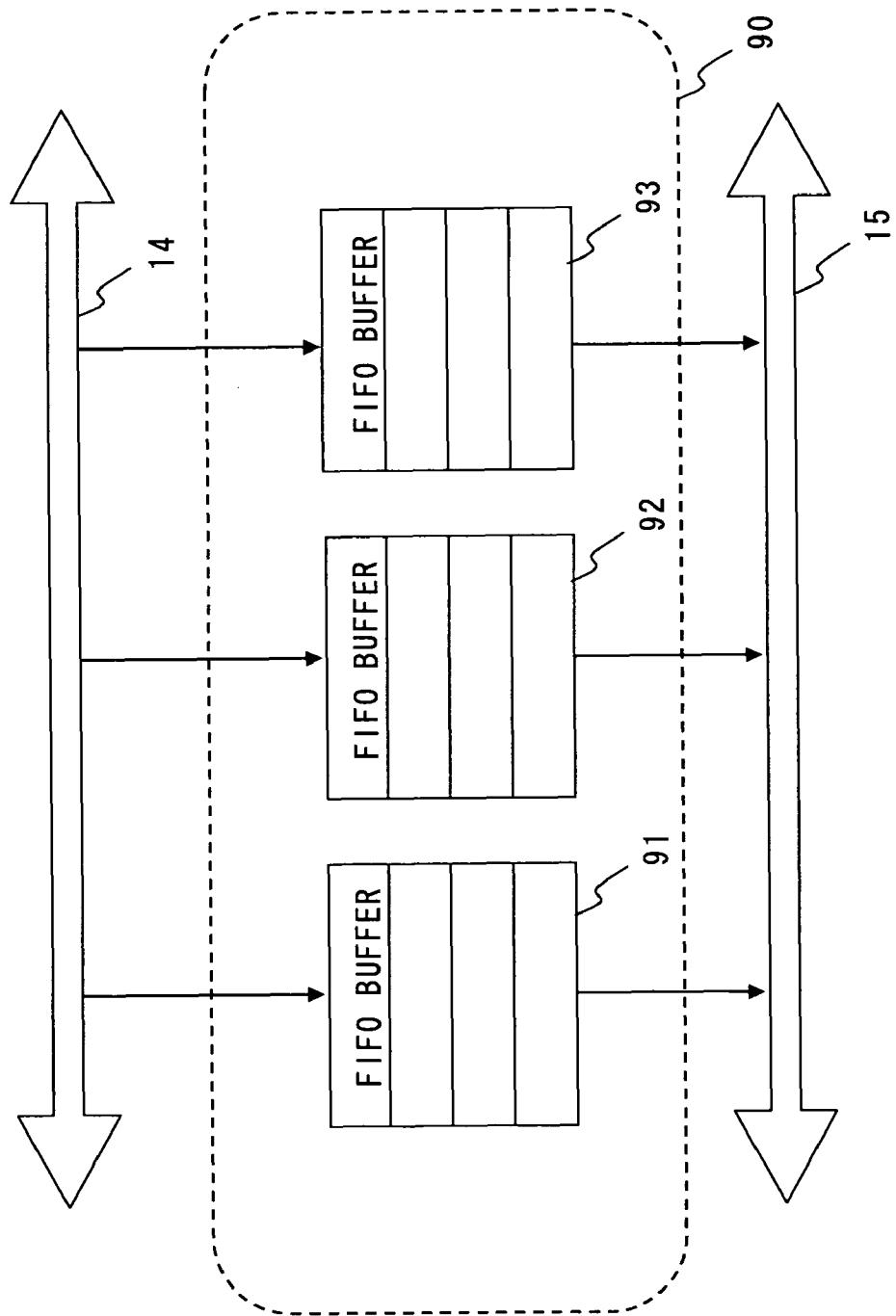
FIG. 11 is a diagram showing a configuration example of a FIFO device.

Next, operations of the FIFO device 30 of this exemplary embodiment will be described with reference to timing diagrams. FIGS. 9 and 10 are timing diagrams each showing an example in which transfer requests are combined together according to the second exemplary embodiment. FIG. 9 shows transfer requests transferred from the bus 14 and the output of the transfer request generation unit 40. FIG. 10 shows the output of the transfer request generation unit 41 and data written into the FIFO buffers. Herein, the operations different from those of the first exemplary embodiment are mainly described, and a description of similar operations is omitted. FIGS. 9 and 10 each show clock times T0 to T6. In the registers 4 to 6, it is assumed that the value X of an address, the value 4'bxxxx of a write strobe, and the value 32'hXXXX_XXXX of data are initial values.

Additionally, a usage state indicates a time period in which the transfer request generation units 40 and 41 are accepting a transfer request, and also indicates a time period in which the acceptance is not started yet or the acceptance is cancelled. Specifically, the time period in which the transfer request is accepted refers to a time period in which the transfer request is accepted when the control signal, which is input to the control signal generation unit 35 of each of the transfer request generation units 40 and 41 from the control unit 34, (hereinafter, the control signal is referred to as "status signal") is at the H (1) level. Further, the time period in which the acceptance is not started yet or the reception is cancelled refers to a time period in which the transfer request is not accepted when the status signal is at the L (zero) level.

Furthermore, when the transfer request is transferred to the bus 14, the control unit 34 selects in advance the transfer request generation unit that accepts the transfer request. It is assumed herein that the transfer request generation unit 40 is already selected as one that accepts the transfer request. In FIGS. 9 and 10, each of the dashed arrows shown in the processing of the control unit 34 indicates a period of time in which the control unit 34 selects the transfer request generation unit that accepts the transfer request, and each of the solid-line arrows shown in the processing of the control signal generation unit 35 represents a period of time for determining whether the transfer requests can be combined or not, based on the write address and the write strobe.

At the time of the clock T0, the control unit 34 detects that the transfer request has been transferred from the bus 14, and the control unit 34 selects the transfer request generation unit 40. The operations for inputting the transfer request transferred from the bus 14 to each of the transfer request generation units 40 and 41, and the determination as to whether the transfer requests can be combined or not, are similar to those of the exemplary embodiment of the present invention. In this case, the control signal generation unit 35 of the transfer request generation unit 40 determines that the transfer requests cannot be combined together.

In the transfer request generation unit 40, the control signal generation unit 35 outputs, to each of the multiplexers 7 to 9, a selection signal for outputting the output from the bus 14 to each of the registers 4 to 6. During a time period from T0 to T1, the multiplexers 7 to 9 select the data output from the bus 14, and on the rising edge of the clock T1, the registers 4 to 6 each hold the data output from the bus 14. At the same time, the data held in the registers 4 to 6 is output to the multiplexers 31 to 33, respectively.

At the time of the clock T1, the control unit 34 sets the status signal of the transfer request generation unit 40 to the H level, based on the processing results obtained at the time of the clock T0. The transfer request newly received from the bus 14 can be accommodated in the unused area of the register 6, and therefore, the control signal generation unit 35 determines that the transfer requests can be combined together. The control signal generation unit 35 notifies the control unit 34 of the determination result indicating that the transfer requests can be combined together (i.e., transfer request is acceptable). Further, at this time, the control signal generation unit 35 outputs a control signal for outputting calculation results (that is, combined transfer requests) to each of the arithmetic units 36 to 38, and also outputs a selection signal for selecting the output of the arithmetic units 36 to 38, to each of the multiplexers 7 to 9. During a time period from T1 to T2, the multiplexers 7 to 9 select the data output from the arithmetic units 36 to 38, and on the rising edge of the clock T2, the registers 4 to 6 hold the data output from the arithmetic units 36 to 38, respectively.

At the time of the clock T2, in the transfer request generation unit 40, the write address is not within the range that can be accommodated in the unused area of the register 6, and therefore, the control signal generation unit 35 determines that the transfer requests cannot be combined together. The control signal generation unit 35 notifies the control unit 34 of the determination result indicating that the transfer requests cannot be combined together (that is, transfer request is not acceptable). Further, at this time, the control signal generation unit 35 outputs a control signal for outputting the values held in the registers 4 to 6 (that is, combined transfer requests previously held), to each of the arithmetic units 36 to 38, and also outputs a selection signal for selecting the output of the arithmetic units 36 to 38 to each of the multiplexers 7 to 9. During a time period from T2 to T3, the multiplexers 7 to 9 each select the data output from the arithmetic units 36 to 38, and on the rising edge of the clock T3, the registers 4 to 6 hold the data output from the arithmetic units 36 to 38, respectively.

Upon reception of the determination result indicating that the transfer requests cannot be combined together, from the transfer request generation unit 40, the control unit 34 confirms the status of the other transfer request generation unit 41. In this case, since the transfer request generation unit 41 is not used, the control unit 34 instructs the transfer request generation unit 41 to accept the new transfer request. At this time, the control unit 34 selects the transfer request generation unit 41.

At the time of the clock T3, the control unit 34 sets the status signal of the transfer request generation unit 41 to the H level, based on the processing results obtained at the time of the clock T2. The control signal generation unit 35 of the transfer request generation unit 40 determines that the transfer requests can be combined together, since the transfer request newly received from the bus 14 can be accommodated in the unused area of the register 6. Meanwhile, the control signal generation unit 35 of the transfer request generation unit 41 determines that the transfer requests cannot be combined together, since the transfer request newly received from the bus 14 cannot be accommodated in the unused area of the register 6. The subsequent operations are carried out in a similar manner according to the determination result.

At the time of the clock T4, the control signal generation unit 35 of the transfer request generation unit 40 determines that the transfer requests cannot be combined together, since the transfer request newly received from the bus 14 cannot be accommodated in the unused area of the register 6. Meanwhile, the control signal generation unit 35 of the transfer request generation unit 41 determines that the transfer requests can be combined together, since the transfer request newly received from the bus 14 can be accommodated in the area of the register 6. The subsequent operations are carried out in a similar manner as described above according to the determination result.

At the time of the clock T5, the control signal generation unit 35 of the transfer request generation unit 40 determines that the transfer requests cannot be combined together, since the transfer request newly received from the bus 14 cannot be accommodated in the unused area of the register 6. Likewise, the control signal generation unit 35 of the transfer request generation unit 41 determines that the transfer requests cannot be combined together, since the transfer request newly received from the bus 14 cannot be accommodated in the unused area of the register 6.

Upon reception of the determination result indicating whether the transfer requests can be combined or not, from both the transfer request generation units 40 and 41, the control unit 34 selects one of the transfer request generation units 40 and 41 as a reception destination. The control unit 34 selects one of the transfer request generation units 40 and 41 according to a given rule. For example, the transfer request generation units are selected alternately, or the transfer request generation unit in which the number of combinations of transfer requests is greater is selected. In this case, the control unit 34 selects the transfer request generation unit 40, and instructs the transfer request generation unit 40 to accept the new transfer request. Simultaneously, the control unit 34 causes the multiplexers 31 to 33 to select the transfer request held by the transfer request generation unit 40, and writes the selected transfer request to each of the FIFO buffers 1 to 3 with the use of the write signal.

Referring to FIG. 9, the control unit 34 instructs the acceptance of the new transfer request with the use of the status signal. Specifically, the data of the transfer request generation unit 40 is being written, and thus, the control unit 34 changes the status signal indicating the usage state of the transfer request generation unit 40 to the L level. At the same time, the control unit 34 selects the transfer request generation unit 40 as the transfer request generation unit that accepts the subsequent transfer request.

The control signal generation unit 35 of the transfer request generation unit 40 outputs a selection signal for selecting the output from the bus 14, to each of the multiplexers 7 to 9 in response to the instruction from the control unit 34. During a time period from T5 to T6, the multiplexers 7 to 9 each select the data output from the bus 14, and on the rising edge of the clock T6, the registers 4 to 6 each hold the data output from the bus 14.

At the time of the clock T6, the data of the transfer request generation unit 41 is being written, and thus, the control unit 34 changes the status signal indicating the usage state of the transfer request generation unit 41 to the L level. Simultaneously, the control unit 34 selects the transfer request generation unit 41 as the transfer request generation unit that accepts the subsequent transfer request. The control signal generation unit 35 of the transfer request generation unit 41 determines that the transfer requests cannot be combined together, since the transfer request newly received from the bus 14 cannot be accommodated in the unused area of the register 6.

FIG. 10 shows a case where the control unit 34 writes the transfer request output from the transfer request generation unit 41, into the FIFO buffers 1 to 3 so that the new transfer request is accepted, since the other transfer request generation unit 40 is started to be used.

As described above, in this exemplary embodiment, the use of the plurality of transfer request generation units enables combination of more transfer requests than those of the first exemplary embodiment. As a result, the number of transfer requests to be transferred from the FIFO device 30 to the bus 15 is suppressed, which leads to an improvement of the transfer efficiency.

Note that, in this exemplary embodiment, the case where the FIFO device 30 includes two transfer request generation units 40 and 41 has been described by way of example. Alternatively, the FIFO device 30 may include three or more transfer request generation units.

Other Exemplary Embodiments

In the first exemplary embodiment, the case where a data size is acquired by a write strobe has been described. Alternatively, a value indicating the length of a data part may be used as a data size. In this case, the control signal generation unit 13 determines whether transfer requests can be combined together, based on a write address and a data size. Specifically, the control signal generation unit 13 determines whether data received as a new transfer request can be written into an area of a register except an area occupied by data that is already held.

A description is further given with reference to FIG. 2. When the write data is stored in the areas "A" and "B", the areas "C" and "D" are used as writable register areas, and the initial address of the area "C" is given as the write address. In this case, data having a size equal to or smaller than two bytes can be written into the free area of the register, and therefore, it is determined that the data can be combined. Meanwhile, if data has a size equal to or larger than three bytes, it is determined that the data cannot be combined.

Though the present invention has been described in accordance with the first exemplary embodiment, a value indicating the length of a data part may also be used as the data size in the second exemplary embodiment.

As described above, according to the exemplary embodiments of the present invention, when transfer requests for writing data are consecutively transferred, the transfer requests are compared with the previous transfer area. Then, when the transfer requests can be combined together, the transfer requests are combined together to be stored in the FIFO buffer, thereby making it possible to transfer the transfer requests at a time. Specifically, there are provided comparison means (e.g., the control signal generation unit 13) that determines whether the write data is combined to be stored in the area of the FIFO buffer, and storage means (e.g., the multiplexers 7 to 9, the arithmetic units 10 to 12, and the control signal generation unit 13) that combines the write data to be stored in the FIFO buffer when the write data can be combined to be stored as a result of the comparison. This leads to a reduction in the number of transfers to an external bus. Consequently, the load imposed on the bus can be reduced, and the deterioration in the transfer efficiency can be suppressed.

Note that the present invention is not limited to the above exemplary embodiments. The components of the above exemplary embodiments can be modified, added, or altered into the contents that can be easily conceived by those skilled in the art without departing from the scope of the invention.

The above described exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A FIFO (First-In First-Out) device that holds a transfer request transferred from a first bus and including a write address, a data size, and write data, and outputs the transfer request to a second bus, the FIFO device comprising:

at least one transfer request generation unit that, upon reception of a first transfer request and a second transfer request subsequent to the first transfer request from the first bus, makes a determination whether the first transfer request and the second transfer request can be combined together, based on a write address and a data size of the first transfer request and a write address and a data size of the second transfer request, and when determining that the first transfer address and the second transfer address can be combined together, replaces a combined transfer request obtained by combining the first transfer request and the second transfer request together, with the first transfer request to be held and output; and a FIFO buffer that holds the transfer request output from the transfer request generation unit, and transfers the transfer request to the second bus.

2. The FIFO device according to claim 1, wherein, when both the first transfer request and the second transfer request can be accommodated in a buffer area having a capacity of storing data transferred by the FIFO buffer at a time, the transfer request generation unit determines, in the determination, that the first transfer request and the second transfer request can be combined together.

3. The FIFO device according to claim 2, wherein, when write data of the first transfer request and write data of the second transfer request can be accommodated in the buffer area having a capacity of storing data transferred at a time, the transfer request generation unit determines, in the determination, that the first transfer request and the second transfer request can be combined together.

4. The FIFO device according to claim 2, wherein the transfer request generation unit receives a transfer request including a data size corresponding to a write data strobe, and determines, in the determination, that the first transfer request and the second transfer request can be combined together, when both the first transfer request and the second transfer request can be accommodated in a buffer area having a capacity of storing write data transferred at a time, and when an area specified by the write data strobe of the second transfer request is not used for the first transfer request.

5. The FIFO device according to claim 1, wherein the transfer request generation unit stores the first transfer request in the FIFO buffer, when determining that the first transfer request and the second transfer request cannot be combined together.

6. The FIFO device according to claim 2, wherein the transfer request generation unit stores the first transfer request in the FIFO buffer, when determining that the first transfer request and the second transfer request cannot be combined together.

7. The FIFO device according to claim 1, wherein the transfer request generation unit comprises:
a plurality of arithmetic units that calculate a write address, a data size, and write data of the combined transfer request with use of the first transfer request and the second transfer request;
a plurality of multiplexers that output a write address, a data size, and write data included in one of the second transfer request and the combined transfer request, based on a selection signal for selecting one of the second transfer request and the combined transfer request;
a plurality of registers that respectively hold information output from the plurality of multiplexers; and
a control signal generation unit that determines whether the first transfer request and the second transfer request can be combined together, to output the selection signal to the plurality of multiplexers, based on a result of the determination, and in a case of outputting a selection signal for selecting the second transfer request, outputs a write signal for instructing to store the information held by the plurality of registers in the FIFO buffer.

8. The FIFO device according to claim 7, wherein
the plurality of registers include a write address register, a data size register, and a write data register, the write address register, the data size register, and the write data register storing a write address, a data size, and write data, respectively, and having a capacity corresponding to the buffer area having a capacity of storing data transferred at a time, and
the control signal generation unit determines, in the determination, that the first transfer request and the second transfer request can be combined together, when the write address of the second transfer request is an address indicating a range capable of storing data together with write data of the first transfer request in the write data register, and when the data size of the second transfer request is a value that falls within a free area of the write data register in which the write data of the first transfer request is not stored.

9. The FIFO device according to claim 7, wherein the control signal generation unit outputs, to the plurality of multiplexers, a selection signal for outputting the combined transfer request, when determining, in the determination, that the first transfer request and the second transfer request can be combined together, and outputs the selection signal for selecting the second transfer request to the plurality of multiplexers, when determining that the first transfer request and the second transfer request cannot be combined together.

10. The FIFO device according to claim 1, wherein
the at least one transfer request generation unit comprises a plurality of transfer request generation units, and
the FIFO device further comprises:
a selection unit that selects any of transfer requests output from the plurality of transfer request generation units and outputs the selected transfer request to the FIFO butter; and
a control unit that receives, from the plurality of transfer request generation units, a notification indicating the determination as to whether the first transfer request and the second transfer request can be combined together; selects any one of the plurality of transfer request generation units when a transfer request generation unit capable of combining the transfer requests together is not present; allows output of a transfer request held by the selected transfer request generation unit, to the FIFO buffer, with use of the selection unit; and requests the selected transfer request generation unit to accept a new transfer request.

11. The FIFO device according to claim 2, wherein
the at least one transfer request generation unit comprises a plurality of transfer request generation units, and
the FIFO device further comprises:
a selection unit that selects any of transfer requests output from the plurality of transfer request generation units and outputs the selected transfer request to the FIFO butter; and
a control unit that receives, from the plurality of transfer request generation units, a notification indicating the determination as to whether the first transfer request and the second transfer request can be combined together; selects any one of the plurality of transfer request generation units when a transfer request generation unit capable of combining the transfer requests together is not present; allows output of a transfer request held by the selected transfer request generation unit, to the FIFO buffer, with use of the selection unit; and requests the selected transfer request generation unit to accept a new transfer request.

12. The FIFO device according to claim 3, wherein
the at least one transfer request generation unit comprises a plurality of transfer request generation units, and
the FIFO device further comprises:
a selection unit that selects any of transfer requests output from the plurality of transfer request generation units and outputs the selected transfer request to the FIFO butter; and
a control unit that receives, from the plurality of transfer request generation units, a notification indicating the determination as to whether the first transfer request and the second transfer request can be combined together;

selects any one of the plurality of transfer request generation units when a transfer request generation unit capable of combining the transfer requests together is not present; allows output of a transfer request held by the selected transfer request generation unit, to the FIFO buffer, with use of the selection unit; and requests the selected transfer request generation unit to accept a new transfer request.

13. The FIFO device according to claim 4, wherein
the at least one transfer request generation unit comprises a plurality of transfer request generation units, and
the FIFO device further comprises:
a selection unit that selects any of transfer requests output from the plurality of transfer request generation units and outputs the selected transfer request to the FIFO butter; and
a control unit that receives, from the plurality of transfer request generation units, a notification indicating the determination as to whether the first transfer request and the second transfer request can be combined together; selects any one of the plurality of transfer request generation units when a transfer request generation unit capable of combining the transfer requests together is not present; allows output of a transfer request held by the selected transfer request generation unit, to the FIFO buffer, with use of the selection unit; and requests the selected transfer request generation unit to accept a new transfer request.

14. The FIFO device according to claim 10, wherein the plurality of transfer request generation units each hold a previously held transfer request as it is, when notifying the determination that the first transfer request and the second transfer request cannot be combined together, and replaces the new transfer request with the transfer request currently held, when the control unit requests to accept the new transfer request transferred from the first bus.

15. The FIFO device according to claim 10, wherein the plurality of transfer request generation units each comprise:
a plurality of arithmetic units that calculate a write address, a data size, and write data of the combined transfer request with use of the first transfer request and the second transfer request;
a plurality of multiplexers that output a write address, a data size, and write data included in one of the second transfer request and the combined transfer request output from the plurality of arithmetic units;
a plurality of registers that hold one of the second transfer request output from the plurality of multiplexers and the combined transfer request, as the first transfer request, and output the first transfer request to the selection unit; and
a control signal generation unit that determines whether the first transfer request and the second transfer requests can be combined together; notifies the control unit of a result of the determination; causes the plurality of arithmetic units to output the combined transfer request, when the determination result indicates that the first transfer request and the second transfer request can be combined together; causes the plurality of arithmetic units to output the first transfer request held by the plurality of registers, in place of the combined transfer request and outputs a selection signal for causing the plurality of multiplexers to select an output from the arithmetic unit, when the determination result indicates that the first transfer request and the second transfer request cannot be combined together; and outputs a selection signal for causing the plurality of multiplexers to select the second transfer request, when the control unit requests to accept the new transfer request transferred from the first bus.

16. The FIFO device according to claim 10, wherein, when the transfer request generation unit notifying that the first transfer request and the second transfer request can be combined together is not present, the control unit selects any one of the plurality of transfer request generation units and stores a transfer request held by the selected transfer request generation unit in the FIFO buffer.

17. The FIFO device according to claim 11, wherein, when the transfer request generation unit notifying that the first transfer request and the second transfer request can be combined together is not present, the control unit selects any one of the plurality of transfer request generation units and stores a transfer request held by the selected transfer request generation unit in the FIFO buffer.

18. The FIFO device according to claim 14, wherein, when the transfer request generation unit notifying that the first transfer request and the second transfer request can be combined together is not present, the control unit selects any one of the plurality of transfer request generation units and stores a transfer request held by the selected transfer request generation unit in the FIFO buffer.

19. The FIFO device according to claim 15, wherein, when the transfer request generation unit notifying that the first transfer request and the second transfer request can be combined together is not present, the control unit selects any one of the plurality of transfer request generation units and stores a transfer request held by the selected transfer request generation unit in the FIFO buffer.

20. A method of storing data in a FIFO (First-In First-Out) buffer, comprising:
receiving and holding a first transfer request transferred from a first bus to a second bus, the first transfer request including a write address, a data size, and write data;
further receiving a second transfer request from the first bus;
determining whether the first transfer request and the second transfer request can be combined together, based on the write address and the data size of the first transfer request and a write address and a data size of the second transfer request;
replacing a combined transfer request obtained by combining the first transfer request and the second transfer request together, with the first transfer request, when a result of the determination indicates that the first transfer request and the second transfer request can be combined together, and holding the first transfer request; and
storing the first transfer request in the FIFO buffer when the determination result indicates that the first transfer request and the second transfer request cannot be combined together.

* * * * *